United States Patent [19]

Joseph et al.

[11] 4,136,011

[45] Jan. 23, 1979

[54] TRANSMISSION FLUID FILTER AND METHOD FOR MANUFACTURE THEREOF

[75] Inventors: A. David Joseph, North Muskegon, Mich.; Elmer E. Ward, Lake Forest, Ill.

[73] Assignee: Sealed Power Corporation, Muskegon, Mich.

[21] Appl. No.: 854,385

[22] Filed: Nov. 23, 1977

[51] Int. Cl.$^2$ .................... F01M 11/00; B01D 39/08
[52] U.S. Cl. ........................ 210/168; 29/163.5 F; 210/171; 210/455
[58] Field of Search .................. 29/163.5 F; 55/511; 210/168, 171, 172, 416 L, 445, 455, 474

[56] References Cited

U.S. PATENT DOCUMENTS

| | | | |
|---|---|---|---|
| 262,702 | 8/1882 | Sears et al. | 210/455 X |
| 1,017,083 | 2/1912 | Cuppel | 210/455 X |
| 1,913,193 | 6/1933 | Crawford | 210/168 X |
| 2,665,009 | 1/1954 | Harstick | 210/445 X |
| 3,480,149 | 11/1969 | Houser | 210/445 |
| 3,807,146 | 4/1974 | Witkowski | 264/252 X |

*Primary Examiner*—Frank A. Spear, Jr.
*Assistant Examiner*—Richard W. Burks
*Attorney, Agent, or Firm*—Barnes, Kisselle, Raisch & Choate

[57] ABSTRACT

A transmission fluid filter having a fluid outlet comprising a sheet metal base member with a plurality of upstanding spaced support bosses. A polyester fiber mesh is molded into a plastic filter frame which includes a peripheral edge for attachment to the base member and a plurality of ribs extending generally from the region of the fluid outlet to the frame edge and supported by the bosses to form a fluid cavity between the mesh and the base member.

10 Claims, 7 Drawing Figures

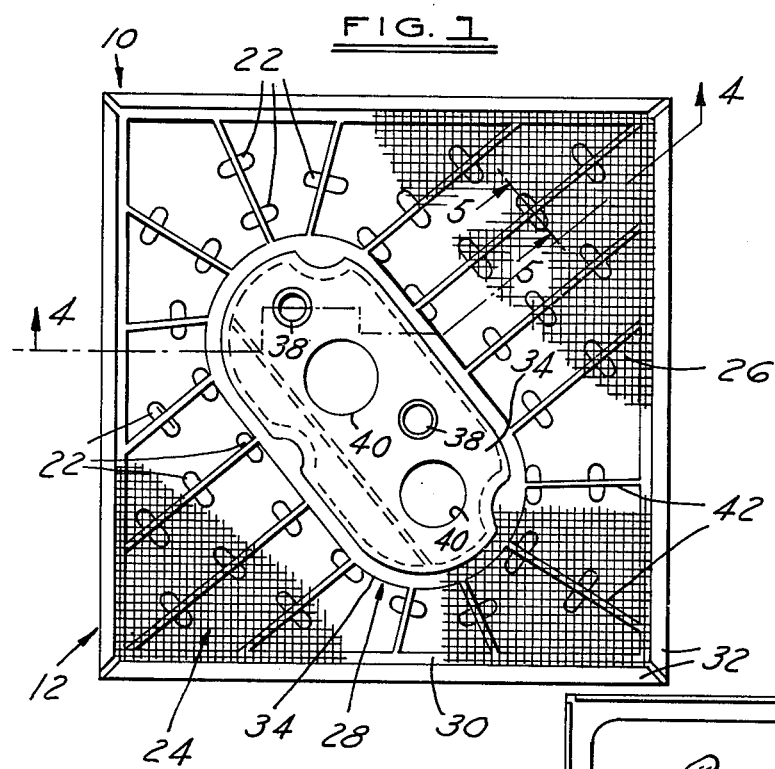
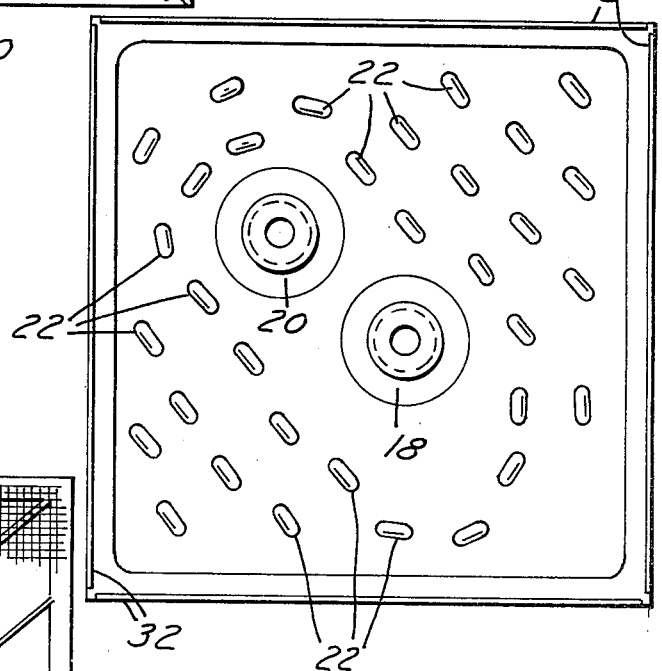
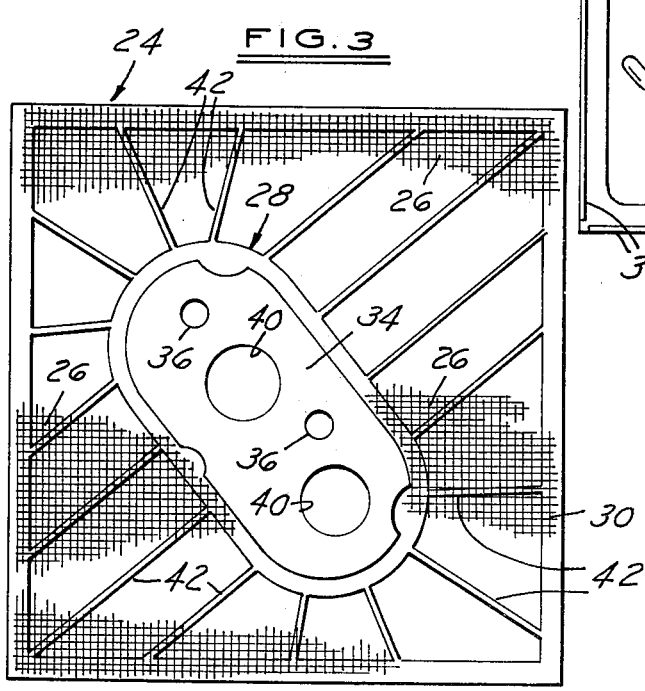

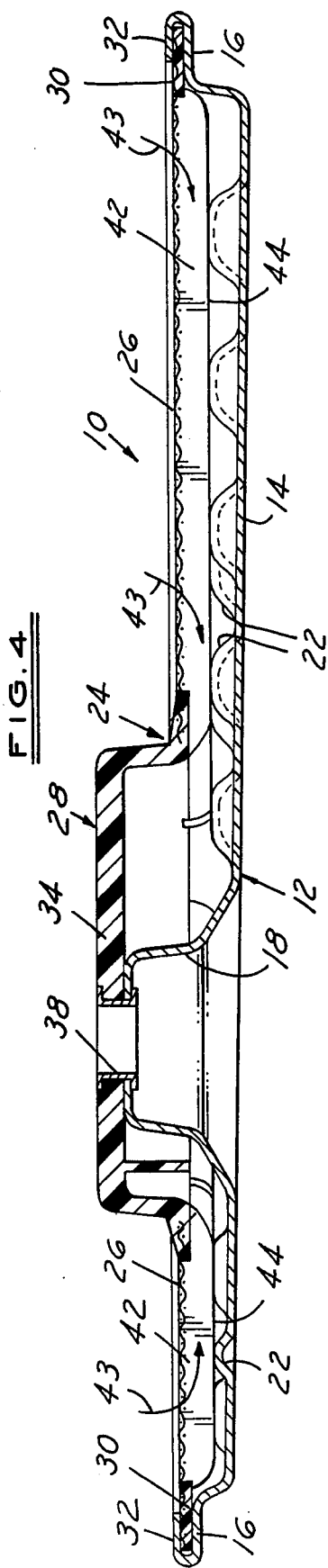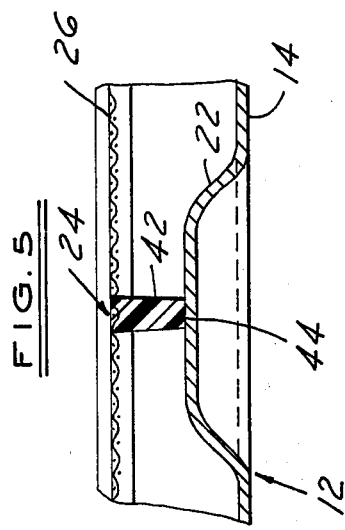

TRANSMISSION FLUID FILTER AND METHOD FOR MANUFACTURE THEREOF

The present invention relates to fluid filters and, more particularly, to transmission fluid filters and methods for manufacture thereof.

An object of the present invention is to provide a fluid filter, specifically a transmission fluid filter, which possesses a minimum number of individual parts, in which the parts are economical to fabricate and assemble, and which is reliable over an extended operating lifetime. Another object of the present invention is to provide an economical method for manufacture of a transmission fluid filter.

The invention, together with additional objects, features and advantages thereof, will be best understood from the following description, the appended claims and the accompanying drawings in which:

FIG. 1 is a plan view of a transmission fluid filter in accordance with the invention;

FIGS. 2 and 3 are respective plan views of the base and filter elements of the filter assembly in FIG. 1;

Figure 6:
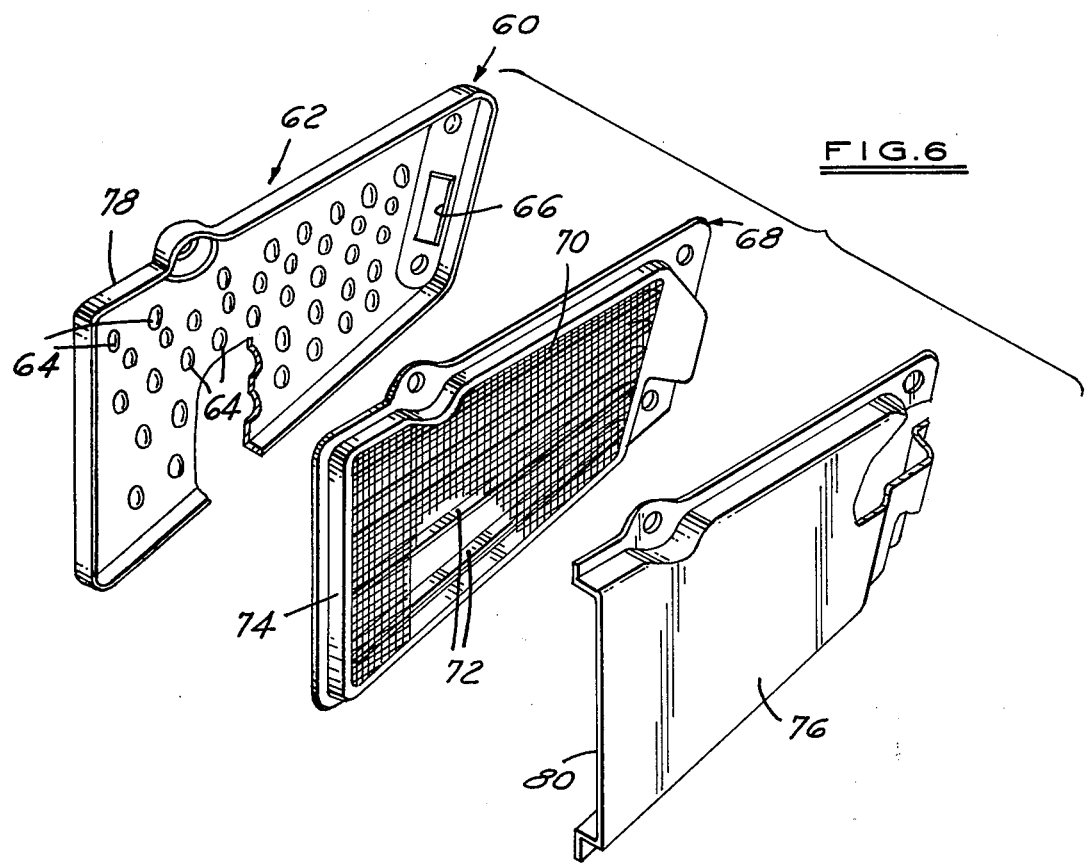
Figure 7:
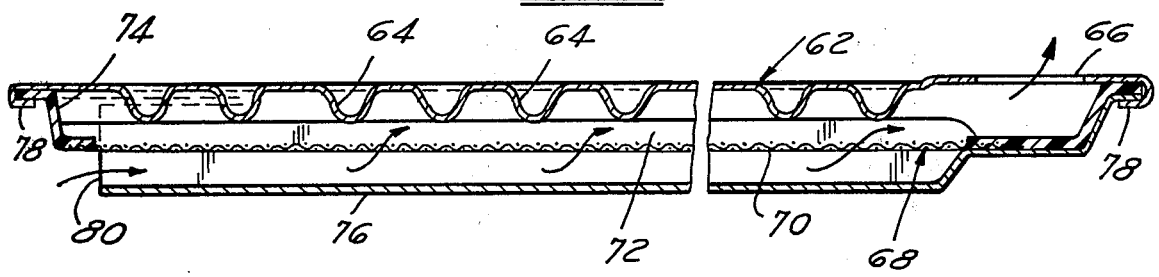

FIGS. 4 and 5 are sectional views respectively taken along the lines 4—4 and 5—5 in FIG. 1;

FIG. 6 is an exploded perspective view of an alternative embodiment of a transmission fluid filter in accordance with the invention; and FIG. 7 is a sectional view similar to that of FIG. 4 longitudinally bisecting the embodiement of FIG. 6.

Referring to FIGS. 1-5, a transmission fluid filter assembly 10 provided in accordance with the invention is illustrated therein and comprises a dished base member or pan 12 of stamped sheet metal or the like having a generally flat bottom wall 14 and a peripheral shoulder 16 spaced axially upwardly therefrom as best seen in FIG. 4. A pair of apertured generally cylindrical shoulders 18, 20 are struck upwardly from base wall 14 in the central portion thereof. A plurality of support bosses 22 are struck upwardly from the base wall in a generally symetrical array, groups of bosses 22 being aligned radially outwardly of support shoulders 18, 20 as best appreciated from FIGS. 1 and 2.

A filter element generally indicated at 24 is carried by base 12 and includes a mesh 26 of plastic fibers which may, for example, be polyester molded into a one-piece support frame 28 of high-temperature synthetic resin such as fiberglass-reinforced nylon. Frame 28 includes a peripheral edge 30 captured against base shoulder 16 by the inwardly struck lips or flanges 32 extending from each shoulder edge. A central portion 34 of frame 28 includes the first apertures 36 (FIG. 3) for attachment to base shoulders 18 as by eyelets 38 (FIGS. 1 and 4) and the second apertures 40 (FIG. 3) in the region of shoulders 18 to provide a filter fluid outlet for connection to a suitable transmission fluid pump (not shown). A plurality of ribs 42 extend generally radially from the region of fluid outlets 40 and connect frame central portion 34 to frame edge 30 integrally therewith. Each of the ribs 42 overlies and is supported in assembly (FIGS. 1 and 4-5) by a corresponding radially aligned group of bosses 22, ribs 42 as a whole thereby spacing mesh 26 from base wall 14 disposed therebelow to form a fluid cavity therebetween.

In addition to the mesh support function hereinabove described, the respective ribs 42 cooperate to form filter sections between adjacent ribs to guide filtered fluid flowing through mesh 26 in the direction generally indicated at 43 (FIG. 4) from adjacent the edge of filter 10 to the region of outlets 40.

The lower edges 44 of ribs 42 are spaced by bosses 22 from base wall 14 to permit lateral flow of fluid between the adjacent filter sections defined by support ribs 42 so that fluid flow will continue and fluid sections will remain operative even if one of the filter sections becomes clogged adjacent the outlets. As best appreciated from FIGS. 4 and 5, mesh 26 is molded into the upper surfaces of frame center 34 and frame edge 30, and into the upper edges of ribs 42 such that the mesh is firmly supported against sagging between adjacent ribs which might otherwise take place due to clogging. Such clogging and sagging in prior art filters not only inhibit proper performance of the associated filter section, but also place undesirable tension on the mesh fibers and may lead to tearing and consequent complete loss of the mesh filtering function. Bosses 22 not only serve to support ribs 42 but also to strengthen and rigidify sheet metal base 12.

FIGS. 6 and 7 illustrated a second embodiment 60 of the automatic transmission fluid filter in accordance with the invention comprising a dished base member or pan 62 with bosses 64 projecting therefrom and a fluid outlet aperture 66. A filter element 68 is received in base member 62 and includes a mesh 70 molded into ribs 72 which extend from the region of outlet 66 to a filter frame periphery 74. A second pan 76 is received over filter element 68 and held by the turned-down flange 78 on base member 62 to define a fluid inlet 80 at the outlet-remote end of filter element 68. In use, ribs 72 are disposed below bosses 64, as best seen in FIG. 7, and held thereagainst by the pressure of fluid drawn through inlet 80, mesh 70 and outlet 66 by a fluid pump (not shown).

Although the filter provided by the present invention and the method for manufacture thereof have thus far been described in connection with automatic transmission fluid filters of specific configuration adapted for use in transmissions of particular automobile manufactures, it will be appreciated that in its broader aspects the invention is applicable not only to other transmission filter configurations but also to filters adapted for other applications and uses. As applied specifically to transmission fluid filters, the invention broadly contemplates a filter medium and a support means for carrying the filter medium, the latter including an outlet for directing filtered fluid to a transmission. The filter medium support means comprises (1) a base member, preferably of stamped sheet metal material, which has a generally flat wall with a plurality of support bosses upstanding therefrom, and (2) a molded plastic filter element or frame having a plurality of ribs and supported by the bosses to carry the filter medium in spaced relation to the base wall. The filter medium is preferably molded into the filter frame including the opposing edges of the support ribs.

The invention claimed is:

1. In a fluid filter assembly comprising a filter medium, support means for carrying said filter medium to permit passage of fluid through said filter medium into a cavity defined between said support means and said filter medium and a fluid outlet from said cavity, the improvement wherein said support means comprises a base member, and a filter support frame having a peripheral edge which cooperates with said base member to define said cavity and a plurality of support ribs extending from adjacent said fluid outlet to said peripheral edge, said filter medium being carried by said ribs in spaced relation to said base member.

2. The improved filter assembly set forth in claim 1 wherein said filter medium is fixed to said filter support frame including said ribs, said filter medium being fixedly suspended between said ribs.

3. The improved filter assembly set forth in claim 2 wherein said base member includes a generally flat wall spaced from said filter medium and a plurality of support bosses upstanding from said wall to support said ribs, the space between said ribs and said wall between said bosses being open to permit lateral fluid flow between filter sections defined between respective pairs of said ribs.

4. The improved filter assembly set forth in claim 3 wherein said filter support frame including said ribs are molded integrally with said filter medium.

5. The improved filter assembly set forth in claim 4 wherein said base member is of sheet metal having said bosses stamped therein and wherein said filter frame is of molded glass-reinforced nylon.

6. A transmission fluid filter comprising a filter medium and means for carrying said filter medium including means for providing a fluid outlet, said means for carrying said filter medium comprising a base member including a generally flat wall having a plurality of support means upstanding therefrom, and a filter frame including a plurality of ribs supported by said support means and carrying said filter medium in spaced relation to said base wall to define a cavity therebetween for passage of fluid to said outlet.

7. The improved filter assembly set forth in claim 6 wherein said ribs extend from adjacent said outlet to a peripheral edge of said filter frame to define a plurality of filter sections between respective ribs for guiding fluid from said peripheral edge to said outlet.

8. The improved filter assembly set forth in claim 7 wherein said support means comprises a plurality of bosses disposed in aligned groups in correspondence with said ribs.

9. The improved filter assembly set forth in claim 8 wherein space between said ribs and said wall between said bosses is open to permit lateral fluid flow between said filter sections.

10. A method of forming a transmission fluid filter which includes a filter medium and support means for carrying said filter medium and defining a fluid outlet, said method comprising the steps of: (a) stamping from sheet metal a base member having a generally flat wall with a first peripheral edge, first means for defining said outlet and a plurality of bosses upstanding from said wall, (b) providing said filter medium in the form of a fiber mesh, (c) molding said mesh into a filter frame comprising second means cooperable with said first means to define said outlet, a second peripheral edge and a plurality of support ribs integrally extending from said second means to said second peripheral edge, and (d) assembling said filter element to said base member about said first and second peripheral edges such that said support ribs rest upon said bosses and said mesh is spaced from said base wall by said bosses and said ribs to define a fluid cavity therebetween.

* * * * *